(12) United States Patent
Smith et al.

(10) Patent No.: US 10,318,089 B2
(45) Date of Patent: Jun. 11, 2019

(54) COMMON MODE CONTROL FOR A RESISTIVE FORCE SENSOR

(71) Applicant: Apple Inc., Cupertino, CA (US)

(72) Inventors: John Stephen Smith, Cupertino, CA (US); Manu Agarwal, Cupertino, CA (US); Christian M. Sauer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 15/274,663

(22) Filed: Sep. 23, 2016

(65) Prior Publication Data

US 2017/0010723 A1 Jan. 12, 2017

Related U.S. Application Data

(63) Continuation-in-part of application No. 14/749,571, filed on Jun. 24, 2015, now Pat. No. 10,006,828.

(60) Provisional application No. 62/292,150, filed on Feb. 5, 2016.

(51) Int. Cl.
*G06F 3/045* (2006.01)
*G01L 1/20* (2006.01)
*G01L 1/22* (2006.01)

(52) U.S. Cl.
CPC .............. *G06F 3/045* (2013.01); *G01L 1/205* (2013.01); *G01L 1/225* (2013.01)

(58) Field of Classification Search
None
See application file for complete search history.

(56) References Cited

U.S. PATENT DOCUMENTS

| 4,342,460 | A | | 8/1982 | Eng |
| 5,047,952 | A | | 9/1991 | Kramer |
| 5,159,159 | A | | 10/1992 | Asher |
| 5,717,935 | A | | 2/1998 | Zanders |
| 5,915,285 | A | * | 6/1999 | Sommer ............... G01L 1/2287 338/2 |
| 6,002,389 | A | | 12/1999 | Kasser |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Paul M. West
*Assistant Examiner* — Mark A Shabman
(74) *Attorney, Agent, or Firm* — Brownstein Hyatt Farber Schreck, LLP

(57) ABSTRACT

Several techniques for driving a force sensor to reduce common mode offset are disclosed. The force sensor can include at least one set of individual strain sensitive structures formed on or in a surface of a substrate. Each set of individual strain sensitive structures can include one or more strain sensitive structures. At least one external resistor is operably connected in series between a first output of one or more transmitter channels and at least one set of strain sensitive structures. The external resistor(s) effectively increases the resistances of the strain sensitive structures to reduce the common mode offset. Additionally or alternatively, one or more signal generators may be connected to one or more transmitter channels. Each signal generator is configured to produce one or more signals that is/are designed to reduce common mode offset.

20 Claims, 15 Drawing Sheets

(56) References Cited

U.S. PATENT DOCUMENTS

| | | |
|---|---|---|
| 6,034,404 A | 3/2000 | Soares |
| 6,050,962 A | 4/2000 | Kramer |
| 6,701,296 B1 | 3/2004 | Kramer |
| 6,748,810 B2 | 6/2004 | Christensen et al. |
| 7,017,420 B2 | 3/2006 | Kalvesten et al. |
| 7,042,380 B2 | 5/2006 | Iacob et al. |
| 7,536,919 B2 | 5/2009 | Powlesland et al. |
| 7,538,760 B2 | 5/2009 | Hotelling et al. |
| 7,735,372 B2 | 6/2010 | Walter |
| 7,784,366 B2 | 8/2010 | Daverman et al. |
| 7,821,506 B2 | 10/2010 | Sato |
| 8,248,286 B2 | 8/2012 | Neagoe |
| 8,479,585 B2 | 7/2013 | Shaw-Klein |
| 8,492,238 B2 | 7/2013 | Celik-Butler et al. |
| 8,686,714 B2 | 4/2014 | Goossens |
| 8,780,074 B2 | 7/2014 | Castillo et al. |
| 8,886,334 B2 | 11/2014 | Ghaffari et al. |
| 9,035,903 B2 | 5/2015 | Binstead |
| 9,116,569 B2 | 8/2015 | Stacy et al. |
| 9,136,459 B2 | 9/2015 | Fujii et al. |
| 9,246,486 B2 | 1/2016 | Yang et al. |
| 9,276,191 B2 | 3/2016 | Ando et al. |
| 9,281,415 B2 | 3/2016 | Bao et al. |
| 9,952,262 B2 | 4/2018 | Deschildre et al. |
| 2003/0160768 A1 | 8/2003 | Tanabe et al. |
| 2011/0167972 A1 | 7/2011 | Gilliver et al. |
| 2013/0042702 A1 | 2/2013 | Huang et al. |
| 2013/0082970 A1 | 4/2013 | Frey et al. |
| 2014/0338459 A1 | 11/2014 | Besling et al. |
| 2014/0368455 A1 | 12/2014 | Croisonnier et al. |
| 2016/0062517 A1 | 3/2016 | Meyer et al. |
| 2016/0195441 A1 | 7/2016 | Sauers et al. |
| 2016/0306481 A1 | 10/2016 | Filiz et al. |
| 2016/0377501 A1 | 12/2016 | Agarwal et al. |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

\* cited by examiner

US 10,318,089 B2

COMMON MODE CONTROL FOR A RESISTIVE FORCE SENSOR

CROSS-REFERENCE TO RELATED APPLICATION(S)

This application is a continuation-in-part of U.S. Non-Provisional patent application Ser. No. 14/749,571, filed on Jun. 24, 2015, and entitled "Systems and Methods for Measuring Resistive Sensors," which is incorporated by reference as if fully disclosed herein. This application claims the benefit under 35 U.S.C. § 119(e) of U.S. Provisional Patent Application No. 62/292,150, filed on Feb. 5, 2016, and entitled "Common Mode Control For A Resistive Force Sensor," which is incorporated by reference as if fully disclosed herein.

FIELD

The described embodiments relate generally to force sensing. More particularly, the present embodiments relate to force sensing with one or more resistive force sensitive structures in an electronic device.

BACKGROUND

Many electronic and input devices include a touch-sensitive surface for receiving user inputs. Devices such as smart telephones, tablet computing devices, laptop computers, track pads, wearable communication and health devices, navigation devices, and kiosks can include a touch-sensitive surface. In some cases, the touch sensitive surface is integrated with a display to form a touch-screen or touch-sensitive display.

The touch-sensitive surface may detect and relay the location of one or more user touches, which may be interpreted by the electronic device as a command or a gesture. In one example, the touch input may be used to interact with a graphical user interface presented on the display of the device. In another example, the touch input may be relayed to an application program operating on a computer system to effect changes to the application program.

Touch-sensitive surfaces, however, are limited to providing only the location of one or more touch events. Moreover, touch, like many present inputs for computing devices, is binary. The touch is either present or it is not. Binary inputs are inherently limited insofar as they can only occupy two states (present or absent, on or off, and so on). In many examples, it may be advantageous to also detect and measure the force of a touch that is applied to a surface. In addition, when force is measured across a continuum of values, it can function as a non-binary input.

Various sensing technologies can be used to detect force, such as capacitive, resistive, ultrasonic, and magnetic technologies. With some resistive technologies, force is determined by detecting changes in resistance between multiple strain sensing elements. In some devices, it is desirable to have the resistances of the strain sensing elements match one another. But differences in the resistances can be caused by variations in fabrication processes, such as variations in alloy ratios, annealing, the deposition temperature, oxygen incorporation, and/or sputtered thickness. In some circumstances, the resistance variations are random. Some of the resistance variations occur over the entire force sensor, while other resistance variations may be more localized. In some situations, mismatches between the resistances can contribute to common mode offset.

SUMMARY

Several techniques for driving a force sensor to reduce common mode offset are disclosed. The force sensor can be included in one or more locations in an electronic device. The one or more locations may include, but are not limited to, a display stack of a display, one or more portions of an enclosure of the electronic device, and/or an input device.

The force sensor can include at least one set of individual strain sensitive structures formed on or in a surface of a substrate. Each set of individual strain sensitive structures can include one or more strain sensitive structures. For example, in one embodiment, a first set of individual strain sensitive structures is formed on a first surface of a substrate and a second set of individual strain sensitive structures is formed on a second surface of the substrate. Each strain sensitive structure in the first set is aligned in at least one direction with a respective strain sensitive structure in the second set to form a strain sensing element.

In one example embodiment, an electronic device may include a force layer and a transmitter channel operably connected to the force layer. The force layer can include a first strain sensitive structure formed in or on a first surface of a substrate, and a second strain sensitive structure formed in or on a second surface of the substrate. The first strain sensitive structure is aligned in at least one direction (e.g., vertically) with the second strain sensitive structure to form a strain sensing element. The transmitter channel is configured to provide drive signals to the strain sensing element. At least one external resistor can be operably connected between a first output of the transmitter channel and the first strain sensitive structure. Additionally or alternatively, at least one external resistor may be operably connected between a second output of the transmitter channel and the second strain sensitive structure. The external resistor(s) effectively increases the resistances of the first and/or second strain sensitive structure to reduce the common mode offset.

In some embodiments, multiple external resistors are connected between at least one output of a transmitter channel and a respective strain sensitive structure. In one non-limiting example, the multiple external resistors can be connected in parallel between the at least one output of the transmitter channel and the respective strain sensitive structure. The total resistance of the external resistors can be adjusted by cutting one or more external resistors to disconnect the external resistors from the first strain sensitive structure.

Additionally or alternatively, a fusible link and at least one external resistor are connected between at least one output of a transmitter channel and a respective strain sensitive structure. In one non-limiting example, the external resistor and the fusible link can be connected in parallel between the at least one output of the transmitter channel and the respective strain sensitive structure. The external resistor(s) can be connected to the respective strain sensitive structure by cutting the fusible link.

In another example embodiment, an electronic device can include a signal generator configured to produce signals at multiple outputs and two or more transmitter channels each operably connected to a respective output of the signal generator. The transmitter channels are configured to provide drive signals to one or more strain sensing elements in a force layer. In one embodiment, the force layer can include a first strain sensitive structure formed in or on a first surface of a substrate, and a second strain sensitive structure formed in or on a second surface of the substrate. The first strain sensitive structure is aligned in at least one direction (e.g., vertically) with the second strain sensitive structure to form a strain sensing element. A receiver channel is operably connected to the strain sensing element to receive force signals from the strain sensing element. The receiver channel includes a differential amplifier, and at least one signal produced by the signal generator is designed to reduce common mode offset that is received by the differential amplifier in the receiver channel.

For example, in one embodiment, the signal generator includes a first direct digital synthesis (DDS) circuit having a first output operably connected to a summing circuit and a second output operably connected to a difference circuit. A second DDS circuit having a third output is operably connected to the summing circuit and a fourth output is operably connected to the difference circuit. The signal produced by the summing circuit can be a first signal that is received by a first transmitter channel. The signal produced by the difference circuit can be a second signal that is received by a second transmitter channel. The first transmitter channel may produce a first drive signal that is provided to the first strain sensitive structure in the strain sensing element. The second transmitter channel may produce a second drive signal that is provided to the second strain sensitive structure in the strain sensing element.

In another embodiment, an electronic device can include a signal generator configured to produce a difference signal and a transmitter channel operably connected to an output of the signal generator. The transmitter channel is configured to provide drive signals to one or more strain sensing elements in a force layer. In one embodiment, the force layer can include a first strain sensitive structure formed in or on a first surface of a substrate, and a second strain sensitive structure formed in or on a second surface of the substrate. The first strain sensitive structure is aligned in at least one direction (e.g., vertically) with the second strain sensitive structure to form a strain sensing element. A receiver channel is operably connected to the strain sensing element to receive force signals from the strain sensing element. The receiver channel includes a differential amplifier, and at least one signal produced by the signal generator is designed to reduce common mode offset that is received by the differential amplifier in the receiver channel.

For example, in one embodiment, the signal generator includes a first direct digital synthesis (DDS) circuit having an output operably connected to a first input of a difference circuit and a second DDS circuit having an output operably connected to a second input of the difference circuit. The signal produced by the difference circuit can be received by the transmitter channel. In one non-limiting embodiment, the signal produced by the difference circuit is received by a first digital-to-analog converter. An output of the first digital-to-analog converter is received by a first input of an amplifier. An output of a second digital-to-analog converter is received by a second input of an amplifier. A first output of the amplifier can be a first drive signal that is provided to the first strain sensitive structure in the strain sensing element. A second output of the amplifier may produce a second drive signal that is provided to the second strain sensitive structure in the strain sensing element.

In yet another embodiment, an electronic device can include one or more signal generators that are each configured to produce a digitally controlled output signal. In one non-limiting embodiment, a direct digital synthesis (DDS) circuit is used as a signal generator. Each signal generator provides a drive signal to one or more strain sensing elements in a force layer. In one embodiment, the force layer can include a first strain sensitive structure formed in or on a first surface of a substrate, and a second strain sensitive structure formed in or on a second surface of the substrate. The first strain sensitive structure is aligned in at least one direction (e.g., vertically) with the second strain sensitive structure to form a strain sensing element. A receiver channel is operably connected to the strain sensing element to receive force signals from the strain sensing element. The receiver channel includes a differential amplifier, and at least one signal produced by the signal generator is designed to reduce common mode offset that is received by the differential amplifier in the receiver channel.

For example, in one embodiment, a first DDS circuit has an output operably connected to one or more strain sensitive structures in a first set of individual strain sensitive structures. A second DDS circuit has an output operably connected to one or more strain sensitive structures in a second set of individual strain sensitive structures. In some embodiments, the output of the first DDS circuit is also operably connected to a first reference element and the output of the second DDS circuit is operably connected to a second reference element. Alternatively, an output of a third DDS circuit can be operably connected to the first reference element and an output of a fourth DDS circuit may be operably connected to the second reference element.

In another embodiment, a force sensor can include a first strain sensitive structure and a second strain sensitive structure electrically coupled as a first voltage divider. A method of reading the force sensors includes: coupling a first digitally-controlled resistor to a second digitally controlled resistor as a second voltage divider; coupling the first voltage divider to the second voltage divider to form a balancing network; setting the resistance of the first and the second digitally controlled resistor based on a first and the second calibration value; transmitting a first drive signal to the balancing network, the first drive signal comprising a summed signal of a first synthesized digital signal and a second synthesized digital signal; transmitting a second drive signal to the balancing network, the second drive signal comprising a difference signal between the first synthesized digital signal and the second synthesized digital signal; and obtaining a measurement of a voltage between midpoints of the balancing network.

BRIEF DESCRIPTION OF THE DRAWINGS

The disclosure will be readily understood by the following detailed description in conjunction with the accompanying drawings, wherein like reference numerals designate like structural elements, and in which.

Figure 1:
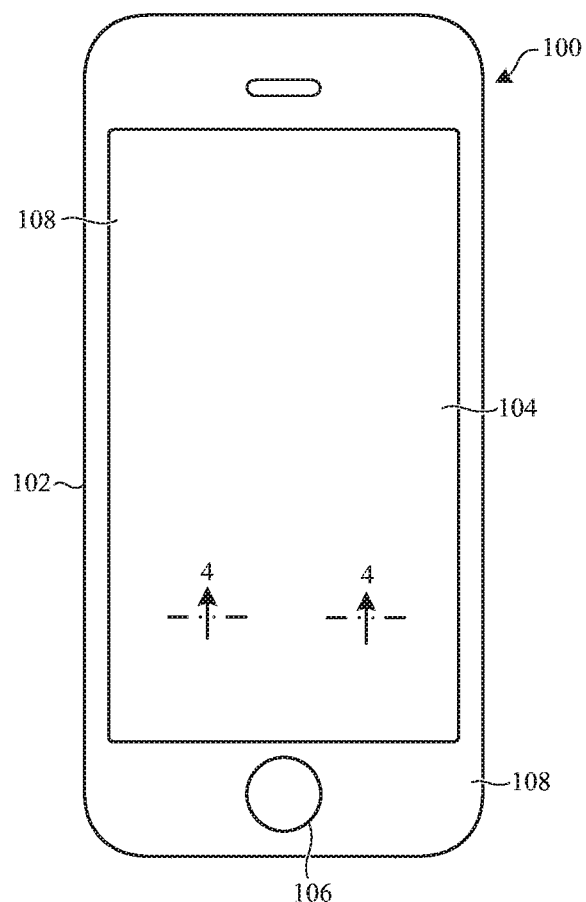
FIG. 1 shows one example of an electronic device that can include one or more resistive force sensitive structures.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein provide techniques for driving a force sensor to reduce common mode offset. The force sensor can be included in one or more locations in an electronic device. The one or more locations may include, but are not limited to, a display stack of a display, one or more portions of an enclosure of the electronic device, and/or an input device.

The force sensor can include at least one set of individual strain sensitive structures formed on or in a surface of a substrate. Each set of individual strain sensitive structures can include one or more strain sensitive structures. For example, in one embodiment, a first set of individual strain sensitive structures is formed on a first surface of a substrate and a second set of individual strain sensitive structures is formed on a second surface of the substrate. Each strain sensitive structure in the first set is aligned in at least one direction with a respective strain sensitive structure in the second set to form a strain sensing element.

In one example embodiment, one or more transmitter channels is operably connected to the strain sensing element or elements and is configured to provide drive signals to the strain sensing element(s). One or more receiver channels is/are operably connected to the strain sensing elements and receives force signals from the strain sensing elements. A force signal is a signal that can be correlated to an amount of force that is applied to an input region of an electronic device. Each receiver channel includes a differential amplifier. At least one external resistor is operably connected between (e.g., in series) a first output of the transmitter channel and at least one set of strain sensitive structures. The external resistor(s) effectively increases the resistances of the strain sensitive structures to reduce the common mode voltage. Since the common mode is shifted by differences between the resistances of the strain sensitive structures in each strain sensing element, increasing the resistance of one or both strain sensitive structures can reduce the resistance differences between the strain sensitive structures and shift the common mode to a point of minimal voltage excursion.

In another example embodiment, one or more transmitter channels is operably connected to the strain sensing element or elements and is configured to provide drive signals to the strain sensing element(s). One or more receiver channels is/are operably connected to the strain sensing elements and receives force signals from the strain sensing elements. Each receiver channel includes a differential amplifier. A signal generator is operably connected to one or more transmitter channels. The signal generator is configured to produce different signals that are designed to reduce common mode offset that is received by the differential amplifier in the receiver channel.

For example, in one embodiment, the signal generator can include two direct digital synthesis (DDS) circuits that are each connected to a summing circuit and a difference circuit. The output of the first DDS circuit is electrically connected to an input of the summing circuit and an input of the difference circuit. The output of the second DDS circuit is electrically connected to another input of the summing circuit and another input of the difference circuit. The DDS circuits operate independent of each other. The DDS circuits synthesize digital signals that when combined by the summing and difference circuits produce independent drive signals that are received by the transmitter channel(s).

These and other embodiments are discussed below with reference to FIGS. 1-16. However, those skilled in the art will readily appreciate that the detailed description given herein with respect to these Figures is for explanatory purposes only and should not be construed as limiting.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

FIG. 1 shows one example of an electronic device that can include one or more resistive force sensitive structures. In the illustrated embodiment, the electronic device 100 is implemented as a smart telephone. Other embodiments can implement the electronic device differently. For example, an electronic device can be a laptop computer, a tablet computing device, a wearable computing device, a digital music player, a display input device, a kiosk, a remote control device, a television, and other types of electronic devices that include one or more resistive sensors.

The electronic device 100 includes an enclosure 102 at least partially surrounding a display 104 and one or more input/output (I/O) devices 106. The enclosure 102 can form an outer surface or partial outer surface for the internal components of the electronic device 100. The enclosure 102 can be formed of one or more components operably connected together, such as a front piece and a back piece. Alternatively, the enclosure 102 can be formed of a single piece operably connected to the display 104.

The display 104 can provide a visual output to the user. The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 104 can function as an input device that allows the user to interact with the electronic device 100. For example, the display can be a multi-touch touchscreen LED display.

In some embodiments, the I/O device 106 can take the form of a home button, which may be a mechanical button, a soft button (e.g., a button that does not physically move but still accepts inputs), an icon or image on a display, and so on. Further, in some embodiments, the I/O device 106 can be integrated as part of a cover layer 108 and/or the enclosure 102 of the electronic device. Although not shown in FIG. 1, the electronic device 100 can include other types of I/O devices, such as a microphone, a speaker, a camera, and one or more ports, such as a network communication port and/or a power cord port.

A cover layer 108 may be positioned over the front surface of the electronic device 100. At least a portion of the cover layer 108 can receive touch and/or force inputs. The cover layer 108 can be formed with any suitable transparent material, such as glass, plastic, sapphire, or combinations thereof. In one embodiment, the cover layer 108 covers the display 104 and the I/O device 106. Touch and force inputs can be received by the portion of the cover layer 108 that covers the display 104 and/or by the portion of the cover layer 108 that covers the I/O device 106. In another embodiment, the cover layer 108 covers the display 104 but not the I/O device 106. In such embodiments, the I/O device 106 can be positioned in an opening or aperture formed in the cover layer 108 and/or in the enclosure 102. The I/O device 106 can receive touch and/or force inputs as well as the portion of the cover layer 108 that covers the display 104.

A resistive force sensitive structure or structures can be included in one or more locations of the electronic device 100. As one example, one or more strain gauges (e.g., thin film strain gauges) or strain sensitive structures (e.g., thin film strain sensitive structures) can be included in the electronic device. Any suitable material can be used to form the strain sensitive structures. For example, in some embodiments the strain sensitive structures are formed with an optically transparent conductive material such as polyethyleneioxythiophene (PEDOT), indium tin oxide (no), carbon nanotubes, graphene, silver nanowire, other metallic nanowires, and the like. As used herein, the term "optically transparent" is defined broadly to include a material that is transparent, translucent, or not visually discernible by the human eye.

The type of material(s) that is used to form a strain sensitive structure can be based at least in part on the location of the strain sensitive structure within the electronic device. For example, in one embodiment the strain sensitive structure or structures may be included in a display stack of the display 104. The strain sensitive structures can be used to measure an amount of force and/or a change in force that is applied to the display or to a portion of the display.

The strain sensitive structure(s) can formed with any suitable optically transparent or opaque material or materials. For example, the strain sensitive structure(s) may be positioned above or over a display layer in the display stack. In such embodiments, the one or more strain sensitive structures can be formed with an optically transparent material. Additionally or alternatively, the strain sensitive structure(s) can be positioned below or under the display layer in the display stack. In such embodiments, the one or more strain sensitive structures can be formed with an opaque material.

In another embodiment, one or more strain sensitive structures may be included in the I/O device 106. The strain sensitive structure(s) can be used to measure an amount of force and/or a change in force that is applied to the I/O device 106. Additionally or alternatively, one or more strain sensitive structures can be positioned under at least a portion of the enclosure 102 to detect a force and/or a change in force that is applied to the enclosure. In such embodiments, the strain sensitive structures can be formed with an optically transparent material or with an opaque material. Example opaque materials include, but are not limited to, a metal or a metal alloy.

Figure 2:
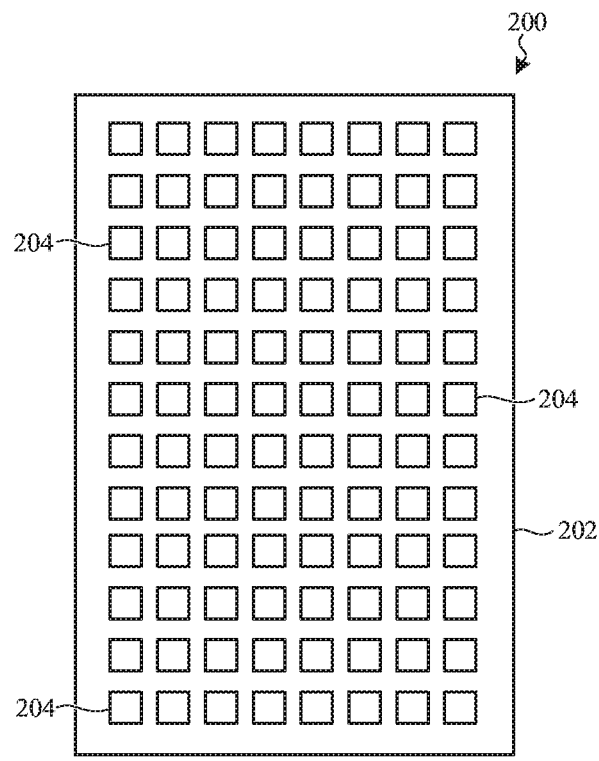
FIG. 2 shows a simplified plan view of an example force layer that includes a grid of strain sensitive structures.
Figure 3:
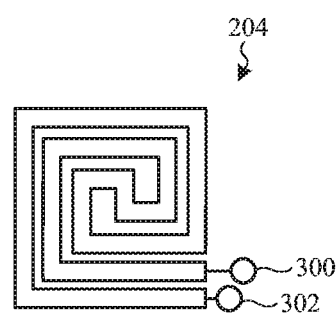
FIG. 3 shows a plan view of one example of a strain sensitive structure that may be used in the example force layer depicted in FIG. 2.

Embodiments are described herein in conjunction with one or more strain sensitive structures being included in a display stack of a display. In one non-limiting example, the entire top surface of the display 104 (or the cover layer 108 disposed over the top surface of the display 104) may be an input region that is configured to receive touch and/or force inputs from a user. FIG. 2 depicts a plan view of an example force layer that is suitable for use in a display stack. The force layer 200 includes a substrate 202 with independent strain sensitive structures 204 formed in or on a surface of the substrate 202. In some embodiments, the substrate 202 may be formed with an optically transparent material, such as polyethylene terephthalate (PET). In other embodiments, the substrate 202 can be formed with an opaque material or with a combination of transparent and opaque materials.

In the illustrated embodiment, the strain sensitive structures 204 are formed as an array of rectilinear sensing elements, although other shapes and array patterns can also be used. In many examples, each individual strain sensitive structure 204 may have a selected shape and/or pattern. For example, in certain embodiments, a strain sensitive structure 204 may be formed, patterned, or deposited in a serpentine pattern, such as the one shown in FIG. 3. The strain sensitive structure 204 may include at least two electrodes 300, 302 that are configured to be operably connected to transmitter and receiver channels. In other cases, a strain sensitive structure 204 may be electrically connected to transmitter and receiver channels without the use of electrodes. For example, a strain sensitive film may be connected to the transmitter and receiver channels using conductive traces that are formed as part of the film layer.

The strain sensitive structures 204 are configured to detect strain based on an amount of force applied to an input region. In some embodiments, the one or more strain sensitive structures are each implemented as a strain sensitive film that produces a signal or a change in a signal in response to strain. In certain embodiments, the strain sensitive films may be selected at least in part on temperature characteristics. For example, the material selected for strain sensitive films may have a negative temperature coefficient of resistance such that, as temperature increases, the resistance decreases.

Figure 4:
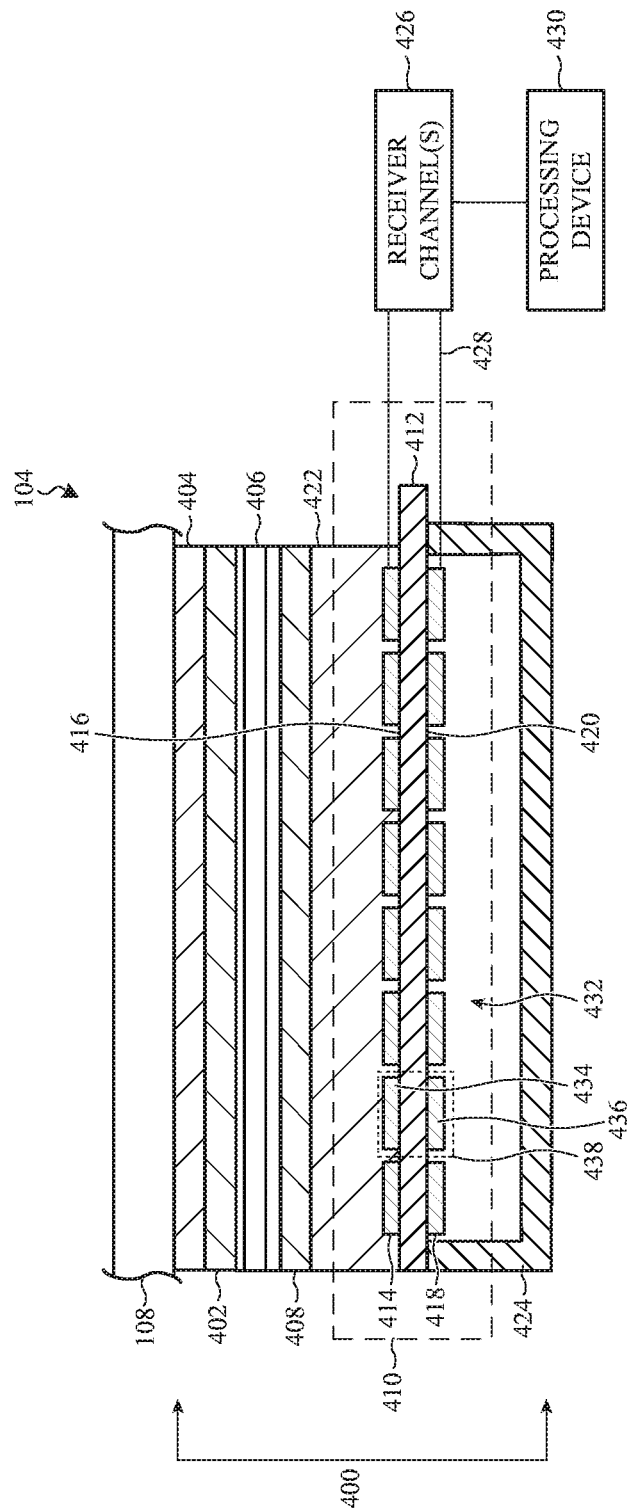
FIG. 4 shows a cross-sectional view of a portion of the display taken along line 4-4 in FIG. 1.

FIG. 4 depicts a cross-sectional view of a portion of the display taken along line 4-4 in FIG. 1. The cross-sectional view illustrates a display stack 400 for the display 104. At least a portion of the cover layer 108 may be positioned over the display stack 400. In particular, the cover layer 108 can be disposed over a front polarizer 402. The cover layer 108 can be a flexible touchable surface that is made of any suitable material, such as, for example, a glass, a plastic, sapphire, or combinations thereof. The cover layer 108 can act as an input region for a touch sensor and a force sensor by receiving touch and force inputs from a user. The user can touch the cover layer 108 with one or more fingers or with another element such as a stylus.

An adhesive layer 404 can be disposed between the cover layer 108 and the front polarizer 402. Any suitable adhesive can be used in the adhesive layer, such as, for example, a liquid optically clear adhesive. A display layer 406 can be positioned below the front polarizer 402. As described earlier, the display layer 406 may take a variety of forms, including a liquid crystal display (LCD), a light-emitting diode (LED) display, and an organic light-emitting diode (OLED) display. In some embodiments, the display layer 406 can be formed from glass or have a glass substrate. Embodiments described herein include a multi-touch touchscreen LCD display layer.

Additionally, the display layer 406 can include one or more layers that is/are not shown in FIG. 4. For example, a display layer 406 can include a VCOM buffer layer, an LCD display layer, and a conductive layer disposed over and/or under the display layer. In one embodiment, the conductive layer may comprise an ITO layer.

A rear polarizer 408 may be positioned below the display layer 406, and a force layer 410 below the rear polarizer 408. The force layer 410 includes a substrate 412 having a first set of independent strain sensitive structures 414 on a first surface 416 of the substrate 412 and a second set of independent strain sensitive structures 418 on a second surface 420 of the substrate 412. In the illustrated embodiment, the first and the second surfaces 416, 420 are opposing front and back surfaces of the substrate 412, respectively. An adhesive layer 422 may attach the substrate 412 to the rear polarizer 408.

Other embodiments can position the first and the second sets of strain sensitive structures 414, 418 on a single surface of the substrate 412. For example, the first and the second sets of strain sensitive structures 414, 418 can be disposed on the first surface 416 of the substrate 412. Additionally or alternatively, other embodiments can include more than two sets of strain sensitive structures. Each set of strain sensitive structures may be positioned on a different surface of a substrate, on multiple substrates, or some of the sets of strain sensitive structures can share a surface of one or more substrates.

A back light unit 424 can be disposed below the force layer 410. The back light unit 424 may be configured to support one or more portions of the substrate 412 that do not include strain sensitive structures. For example, as shown in FIG. 4, the back light unit 424 can support the edges of the substrate 412. Other embodiments may configure a back light unit differently.

The strain sensitive structures are typically connected to one or more receiver channels 426 through conductive connectors 428. The receiver channel(s) 426 is configured to detect changes in an electrical property of each of the strain sensitive structures. In this example, the one or more receiver channels 426 may be configured to detect changes in the resistance of the strain sensitive structures. The signals output from the one or more receiver channels 426 can be received by a processing device 430. The processing device 430 is configured to correlate the signals produced by the receiver channel(s) 426 to an amount of force applied to the cover layer 108. In some embodiments, the receiver channel(s) 426 may also be configured to provide information about the location of a touch based on the relative difference in the change of resistance of the strain sensitive structures.

In the illustrated embodiment, a gap 432 exists between the force layer 410 and the back light unit 424. Strain measurements intrinsically measure the force at a point on the first surface 416 of the substrate 412 plus the force from the bottom at that point on the second surface 420 of the substrate 412. When the gap 432 is included in the display stack 400, there are no forces on the second surface 420. Thus, the forces on the first surface 416 can be measured independently of the forces on the second surface 420.

As described earlier, the strain sensitive structures may be formed as an array of rectilinear strain sensing elements. Each strain sensitive structure in the first set of independent strain sensitive structures 414 is aligned in at least one direction (e.g., vertically) with a respective one of the strain sensitive structures in the second set of independent strain sensitive structures 418. Two aligned strain sensitive structures (e.g., 434 and 436) form a strain sensing element 438. The receiver channel(s) 426 may be adapted to determine a difference in an electrical property (e.g., resistance) of each strain sensing element 438.

For example, as described above, a force may be received on the cover layer 108, which in turn causes the planar force layer 410 to be strained (e.g., to bend or deflect). The second surface 420 of the force layer 410 elongates while the first surface 416 compresses. The strain sensitive structures measure the elongation or compression of a respective surface, and these measurements can be correlated to the amount of force applied to the cover layer 108. In particular, the resistance of one or more strain sensitive structures changes in proportion to the strain. Each receiver channel 426 is configured to detect changes in the one or more strain sensing elements 438, and these changes are correlated to the amount of force applied to the cover layer 108.

In other embodiments, a force layer may be positioned above the display layer. In particular, the force layer can be positioned over the display layer when the display stack does not include the gap 432. Additionally or alternatively, a force layer can include only one set of independent strain sensitive structures on a surface of a substrate. Additionally or alternatively, at least one set of independent strain sensitive structures may be formed on, or attached to, a display layer in a display stack. For example, a set of independent strain sensitive structures can be formed on a second or back surface of an OLED display layer.

Figure 5:
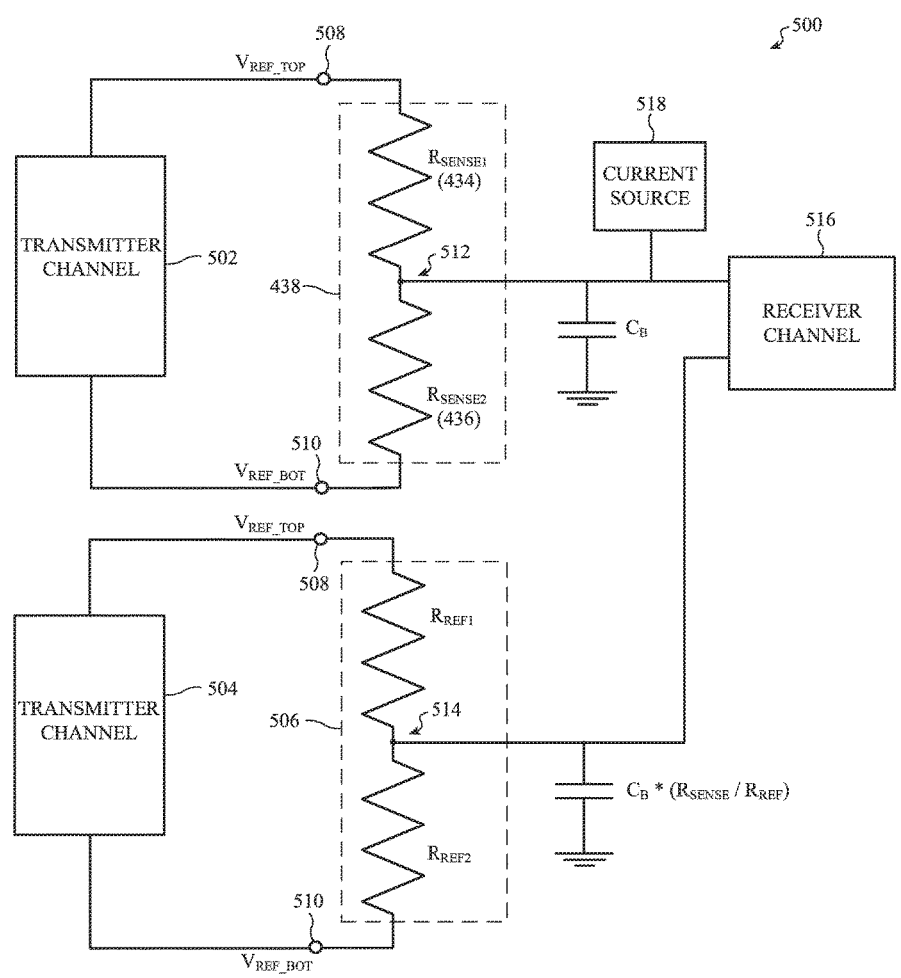
FIG. 5 shows a simplified schematic diagram of a force sensor.

FIG. 5 shows a simplified schematic diagram of a force sensor. The force sensor 500 includes a first transmitter channel 502 operably connected to a strain sensing element 438, and a second transmitter channel 504 operably connected to a reference element 506. As described earlier, a strain sensing element includes two strain sensitive structures aligned in at least one direction (e.g., 434 and 436 aligned vertically in FIG. 4). The first and the second transmitter channels 502, 504 are configured to provide reference signals $V_{REF}$ (e.g., reference voltages) to the strain sensing element 438 (see FIG. 4) and the reference element 506. In some embodiments, the first and the second transmitter channels 502, 504 may be configured as a single transmitter channel that is shared by the strain sensing element 438 and the reference element 506.

The two aligned strain sensitive structures in the strain sensing element 438 can be modeled as two resistors $R_{SENSE1}$ and $R_{SENSE2}$ that are arranged as a voltage divider. $R_{SENSE1}$ corresponds to a respective strain sensitive structure in the first set of independent strain sensitive structures (e.g., 434 in FIG. 4). $R_{SENSE2}$ corresponds to a respective strain sensitive structure in the second set of independent strain sensitive structures (e.g., 436 in FIG. 4).

The reference element 506 may include two reference resistors $R_{REF1}$ and $R_{REF2}$ that are also arranged as a voltage divider. In one embodiment, the reference resistors $R_{REF2}$ and $R_{REF2}$ are separate from the force layer and are each formed with one or more resistors. For example, each reference resistor can be configured as multiple resistors connected in parallel with one or more resistors selected to produce a given resistance for a reference resistor. The reference resistors $R_{REF1}$ and $R_{REF2}$ can be implemented differently in other embodiments.

A first reference signal $V_{REF\_TOP}$ (e.g., voltage) is received at input node 508 and a second reference signal $V_{REF\_BOT}$ (e.g., voltage) is received at input node 510. A force signal at node 512 of the strain sensing element 438 and a reference signal at node 514 of the reference element 506 are received by the receiver channel 516. The receiver channel 516 is configured to detect changes in the resistance of the strain sensing element 438 based on the differences in the force signal and the reference signal produced by the two voltage dividers. The changes can be correlated to the amount of force applied to an input region (e.g., the cover layer 108).

In some embodiments, the strain sensing element 438 and the reference element 506 may be modeled as a Wheatstone bridge circuit, with the strain sensing element 438 forming a half bridge of the Wheatstone bridge circuit and the reference element 506 forming the other half bridge of the Wheatstone bridge circuit. In such embodiments, the input nodes 508 are configured as one node (e.g., the same node), the input nodes 510 are arranged as one node, the first reference signals $V_{REF\_TOP}$ are the same signal (e.g., a single signal), and the second reference signals $V_{REF\_BOT}$ are the same signal. Other embodiments can model the strain sensing element 438 and the reference element 506 differently.

Figure 6:
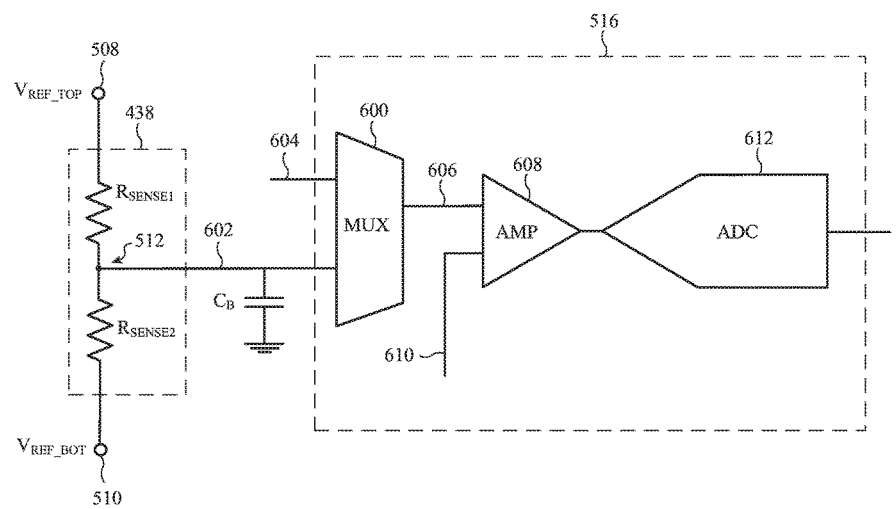
FIG. 6 illustrates a simplified block diagram of a strain sensing element operatively connected to an example receiver channel.

FIG. 6 illustrates a simplified block diagram of a strain sensing element operatively connected to an example receiver channel. The force signal at node 512 is received by a multiplexer 600 on signal line 602. The multiplexer 600 also receives force signals from other strain sensing elements on one or more additional signal lines 604. A force signal output from the multiplexer 600 on signal line 606 is received by an amplifier circuit 608. The reference signal from the reference element (e.g., signal at node 514 in reference element 506 in FIG. 5) is received by the amplifier circuit 608 on signal line 610. As one example, the amplifier circuit 608 may be a differential programmable gain amplifier. The differential programmable gain amplifier amplifies the difference between the force and reference signals received on signal lines 606 and 610, respectively.

An output signal from the amplifier circuit 608 is received by an analog-to-digital converter (ADC) 612. The ADC 612 converts the analog output signal to a digital output signal. The digital output signal may then be processed further by a processing device (not shown) to correlate the digital signal to an amount of force applied to an input region (e.g., cover layer 108).

Referring again to FIG. 5, the receiver channel 516 can be configured as multiple receiver channels with each receiver channel receiving force signals from one or more strain sensing elements 438 and the reference signal from the reference element 506. The number of channels may be determined, at least in part, by the number of multiplexers and the number of ADCs that will be included in the system. For example, in one embodiment, a system can include eight channels with the sense circuitry including four M:1 multiplexers and eight ADCs. Alternatively, in another embodiment, a system may include four channels with the sense circuitry including eight M:1 multiplexers and four ADCs.

Other embodiments can configure the one or more receiver channels 516 differently. Circuits and components can be added or omitted. For example, in some embodiments, the receiver channel(s) 516 does not include the multiplexer 600 such that a strain sensing element 438 and a reference element 506 are operably connected to a single receiver channel.

The voltage at node 512 of the strain sensing element 438 can be used to determine a resistance ratio for $R_{SENSE1}$ and $R_{SENSE2}$. With this divider measurement, the resistor values for $R_{SENSE1}$ and $R_{SENSE2}$ can be defined by the equation $R+\Delta R_D/2$. The output voltage produced by the amplifier circuit 608 (FIG. 6) in the receiver channel 516 may be defined by the equation $V_{OUT}=V_{IN}*\Delta R/4R$.

In some embodiments, a current source 518 can be electrically connected to the node 512. The current source 518 injects an alternating current signal at node 512 that is used to determine a parallel resistance measurement for the strain sensing element 438. With the parallel measurement, the resistor values for $R_{SENSE1}$ and $R_{SENSE2}$ can be defined by the equation $R-\Delta R_P$. The common mode voltage produced at the input of the amplifier circuit 608 (FIG. 6) in the receiver channel 516 may be defined by the equation $V=I*\Delta R_P$.

Using the divider and parallel measurements, the resistance values of $R_{SENSE1}$ and $R_{SENSE2}$ can be determined independently. This permits the resistance values of the strain sensitive structures in each strain sensing element to be determined. Based on the determined resistance values for the strain sensitive structures, in some embodiments the resistance ratio of the reference element is selected to be equal to or as close as possible to the ratio of the mean resistance values of the strain sensing elements 438. In this manner, the difference between the resistance ratio of the reference element 506 and the resistance ratio of each strain sensing element 438 in the force layer 410 can be minimized.

In some situations, the resistance of $R_{SENSE1}$ does not match the resistance of $R_{SENSE2}$. This mismatch can be caused by variations in fabrication processes, such as the deposition temperature, oxygen incorporation, and/or sputtered thickness. In some circumstances, the variations are random. Some of the variations occur over the entire substrate, while other variations may be more localized. In such embodiments, the mismatch between the two resistance values contributes to a common mode error or offset voltage that is received by both inputs of the amplifier circuit 608 (FIG. 6) in a receiver channel. Several techniques for driving the force layer to reduce the common mode voltage are described with reference to FIGS. 7-16. The techniques can compensate for an overall offset between the resistivity of the first set of independent strain sensitive structures and the second set of independent strain sensitive structures (e.g., 414 and 418 in FIG. 4).

Figure 7:
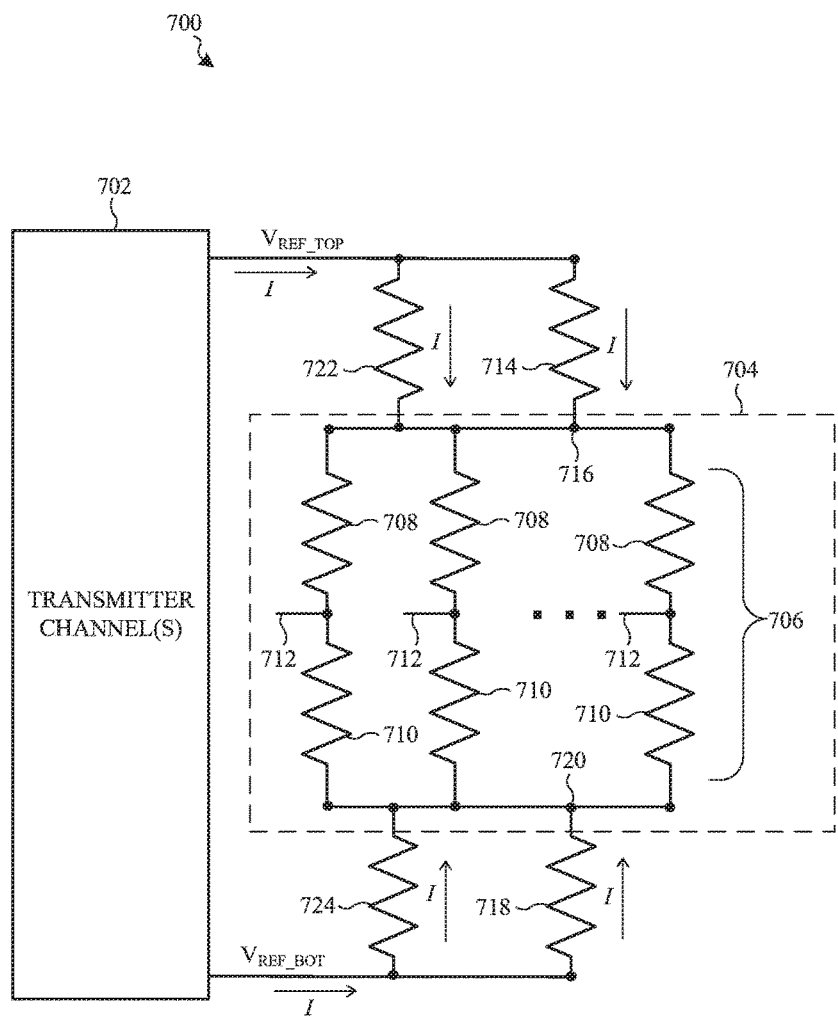
FIG. 7 shows one example of a force sensor that is suitable for use as the force sensor shown in FIG. 5.

FIG. 7 shows one example of a force sensor that is suitable for use as the force sensor shown in FIG. 5. In the illustration, the receiver channel is omitted for simplicity. The force sensor 700 includes one or more transmitter channels 702 operably connected to an array 704 of strain sensing elements 706. The array 704 may include one or more strain sensing elements 706. In the illustrated embodiment, the two aligned strain sensitive structures in each strain sensing element 706 are modeled as two resistors 708 and 710 arranged as a voltage divider. The nodes 712 in each strain sensing element 706 are operably connected to one or more receiver channels (not shown).

A first external resistor 714 may be connected to the array 704. In particular, the first external resistor 714 is connected in series between a first output of the transmitter channel 702 ($V_{REF\_TOP}$ output) and the array 704 (e.g., at input node 716). The first external resistor 714 effectively increases the resistance of each of the strain sensitive structures, which can shift or move the force signal (e.g., voltage) at node 712 to a level that reduces the common mode voltage.

Additionally or alternatively, a second external resistor 718 can be connected to the array 704. The second external resistor 718 is connected in series between a second output of the transmitter channel 702 ($V_{REF\_BOT}$ output) and the array 704 (e.g., at input node 720). The second external resistor 718 effectively increases the resistance of each of the strain sensitive structures, which can shift or move the force signal (e.g., voltage) at node 712 to a level that reduces the common mode voltage. Since the common mode is shifted by differences between the resistances of the resistors 708 and 710, effectively increasing the resistance of the resistor 708 and/or 710 can reduce the resistance differences between the resistors 708 and 710 and shift the common mode to a point of minimal voltage excursion.

In some embodiments, one or more additional external resistors 722 may also be connected in series between the first output of the transmitter channel 702 ($V_{REF\_TOP}$ output) and the array 704 (e.g., at input node 716). In such embodiments, the first external resistor 714 and the one or more additional external resistors 722 are connected in parallel with respect to each other. In some embodiments, at least one additional external resistor (not shown) can be connected in series and/or in parallel with the first external resistor 714 and the one or more additional external resistors 722.

Additionally or alternatively, one or more additional external resistors 724 may be connected in series between the second output of the transmitter channel 702 ($V_{REF\_BOT}$ output) and the array 704 (e.g., at input node 720). In such embodiments, the second external resistor 718 and the one or more additional external resistors 724 are connected in parallel with respect to each other. In some embodiments, at least one additional external resistor (not shown) can be connected in series and/or in parallel with the second external resistor 718 and the one or more additional external resistors 724.

In one embodiment, each external resistor has an equal resistance. In another embodiment, a resistance of at least one of the external resistors can differ from a resistance of another external resistor. And in yet another embodiment, the resistances of all of the external resistors may differ from one another.

In FIG. 7, the drive signals (I) output from the transmitter channel(s) 702 pass through all of the external resistor(s) and the strain sensing elements 706 in the array 704. The amount of current flowing through each external resistor is based on the resistance of the resistors in each current path.

Figure 8:
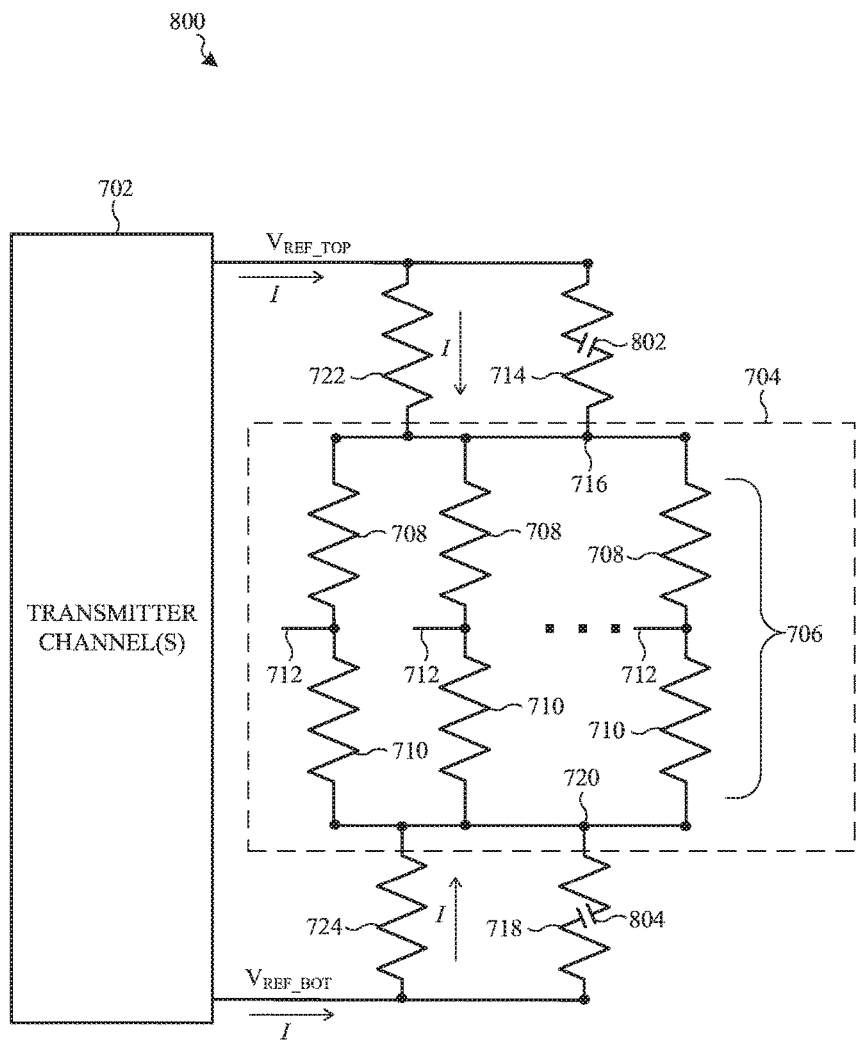
FIG. 8 shows another example of a force sensor that is suitable for use as the force sensor shown in FIG. 5.

In some embodiments, one or more external resistors can be disconnected from the array 704 to reduce the resistance mismatch between the strain sensing elements 706 and the reference element (e.g., 506 in FIG. 5). An example of this embodiment is shown in FIG. 8, where the external resistors 714 and 718 are cut 802, 804 to disconnect the external resistors 714, 718 from the array 704. The external resistors 714, 718 are non-conductive when cut. In such embodiments, the drive signals (I) will only flow through the uncut external resistors 722, 724 (the external resistors electrically connected to the array 704).

One of several techniques may be used to disconnect an external resistor. For example, in one embodiment, one or both external resistors 714, 718 may be laser cut to disconnect the external resistor(s) from the array 704. In another embodiment, a switch (not shown) can be connected in series with each external resistor between the external resistor and the array 704 (or between the external resistor and a respective output of the transmitter channel ($V_{REF\_TOP}$ output or $V_{REF\_BOT}$ output)). One or more switches may be opened to disconnect one or more respective external resistors from the array 704. Similarly, one or more switches may be closed to connect one or more respective external resistors to the array 704. Any suitable switch may be used to disconnect or connect an external resistor from the array 704.

In embodiments where switches are used, select external resistors may be connected to, and disconnected from, the array 704 in real time. The switches allow the effective resistance of the strain sensing elements to be configured and reconfigured as operating conditions change over time. For example, the operating temperature of the force sensor may vary over time.

Figure 9:
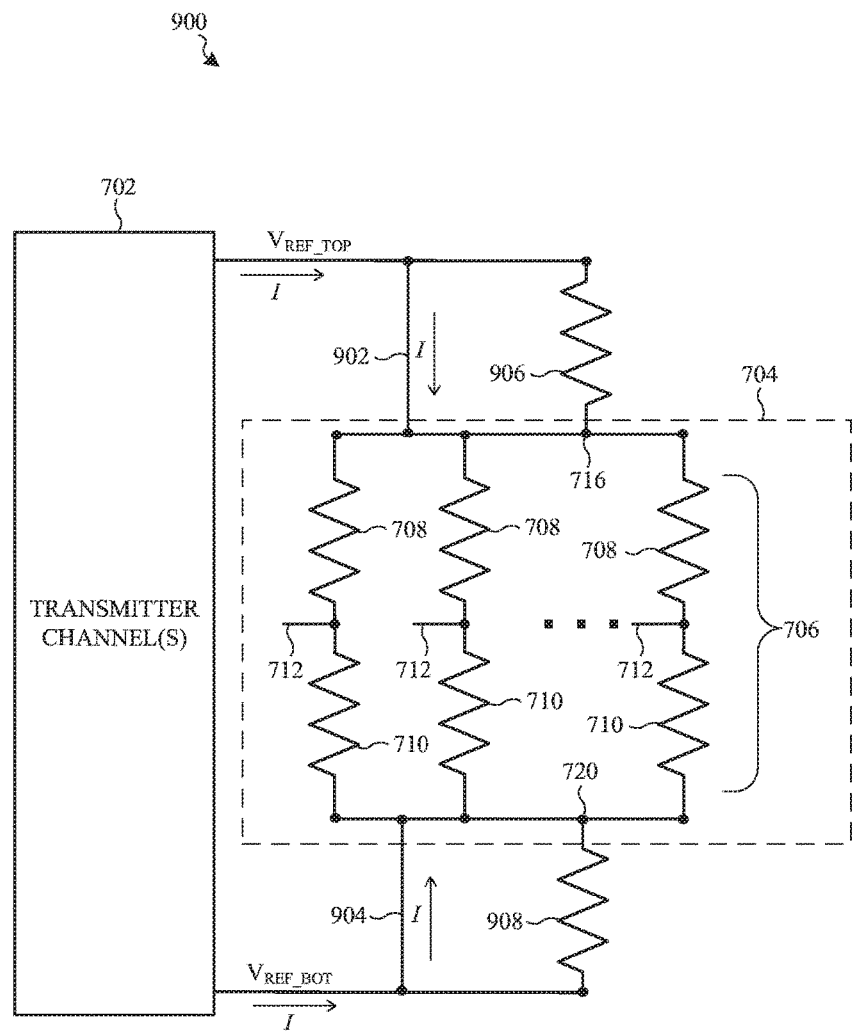
FIG. 9 shows another example of a force sensor that is suitable for use as the force sensor shown in FIG. 5.

FIG. 9 shows one example of a force sensor that is suitable for use as the force sensor shown in FIG. 5. The force sensor 900 depicted in FIG. 9 is similar to the force sensor 700 illustrated in FIG. 7 except for fusible links 902, 904. The first fusible link 902 is connected in parallel with one or more external resistors 906. In particular, the first fusible link 902 is connected between the first output of the transmitter channel 702 ($V_{REF\_TOP}$ output) and the array 704 (e.g., at input node 716). Similarly, the second fusible link 904 is connected in parallel with one or more external resistors 908. The second fusible link 904 is connected between the second output of the transmitter channel 702 ($V_{REF\_BOT}$ output) and the array 704 (e.g., at input node 720).

The first fusible link 902 provides a short between the $V_{REF\_TOP}$ output of the transmitter channel 702 and the array 704. Accordingly, the drive signals (I) output from the transmitter channel(s) flow only through the first fusible link 902 and not through the external resistor(s) 906. Similarly, the second fusible link 904 provides a short between the $V_{REF\_BOT}$ output of the transmitter channel 702 and the array 704. Accordingly, the drive signals flow only through the second fusible link 904 and not through the external resistor(s) 908.

Figure 10:
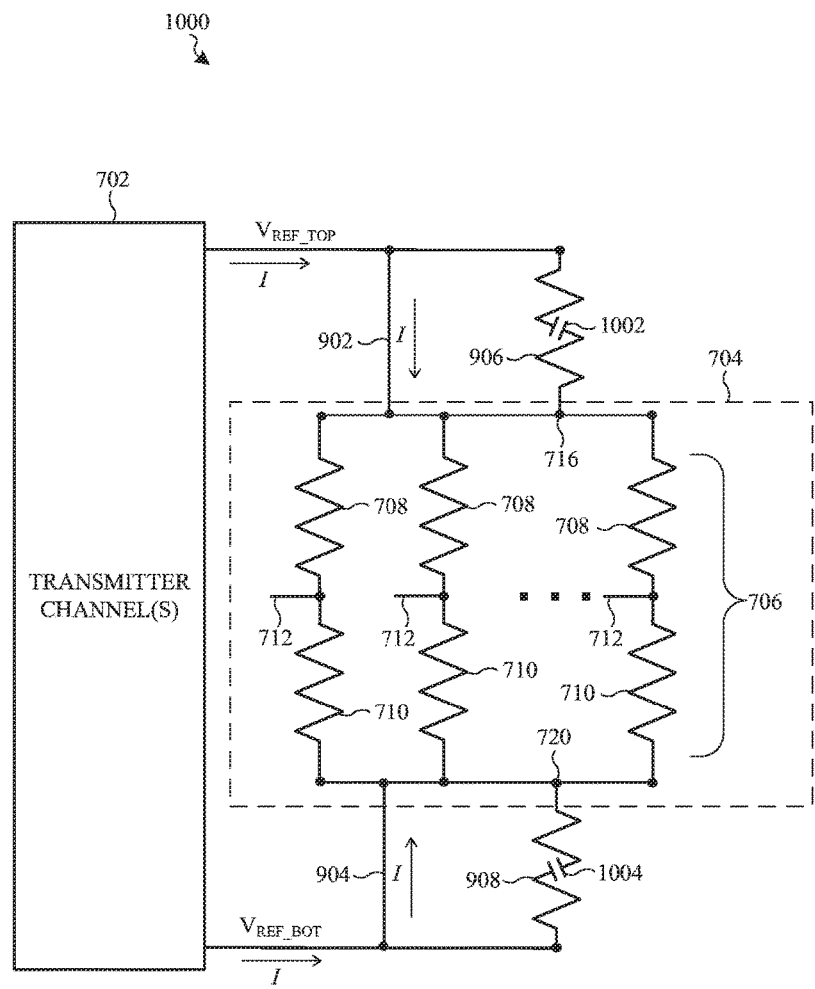
FIG. 10 shows another example of a force sensor that is suitable for use as the force sensor shown in FIG. 5.

In some embodiments, the one or more external resistors 906 and/or 908 may be disconnected from the array 704 to avoid any noise or capacitive coupling. An example of such an embodiment is shown in FIG. 10. As shown in FIG. 10, the one or more external resistors 906 and/or 908 are cut 1002, 1004 to disconnect the external resistor(s) from the array 704. Any suitable technique may be used to disconnect an external resistor from the array (e.g., laser cutting, a switch).

Figure 11:
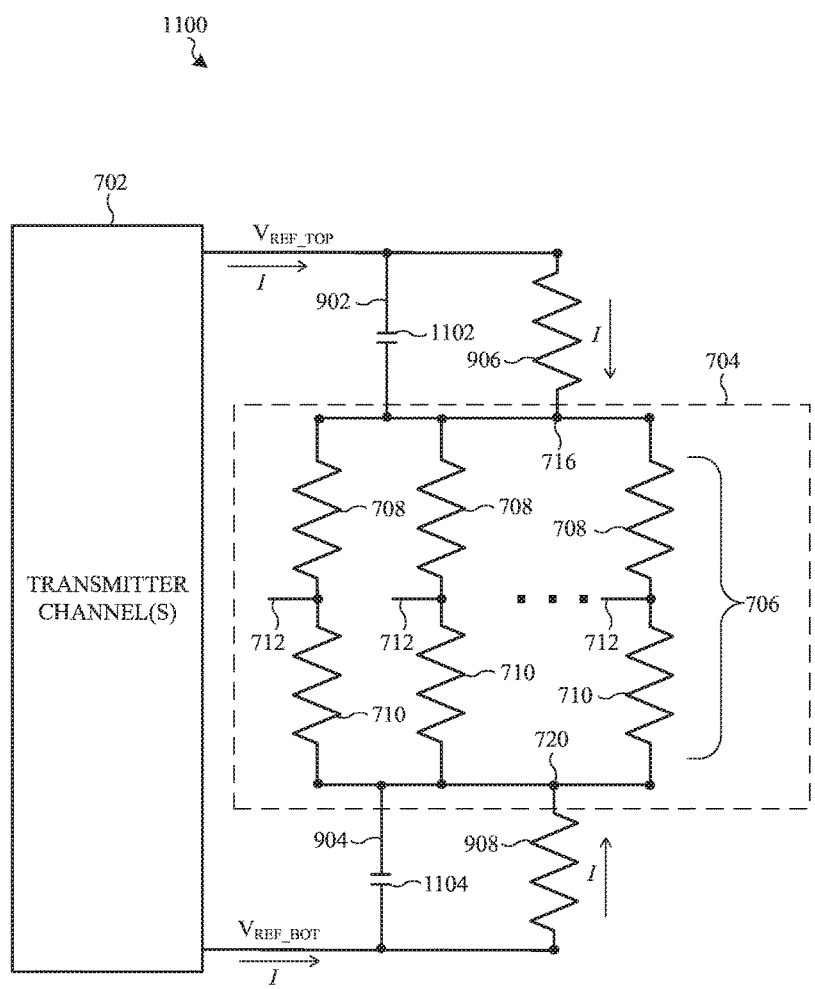
FIG. 11 shows another example of a force sensor that is suitable for use as the force sensor shown in FIG. 5.

In some embodiments, one or both fusible links 902, 904 may be cut to disconnect the fusible link from the array 704. An example of such an embodiment is shown in FIG. 11. When a fusible link is cut (e.g., 1102 and/or 1104), the drive signals flow through the one or more external resistors connected in parallel with the cut fusible link. In one non-limiting example, a fusible link may be laser cut to open the fusible link and cause the fusible link to be non-conductive.

In some embodiments, separate fusible links 902, 904 and/or resistors 906, 908 may be integrated into the sensor layers. In other embodiments, one or both fusible links 902, 904 and/or resistors 906, 908 may be on a separate substrate.

In some embodiments, multiple fusible links 902, 904 and/or resistors 906, 908 can supply one or more groups of strain sensing elements 706. Additionally or alternatively, separate fusible links 902, 904 and/or resistors 906, 908 may be incorporated into some or all of the strain sensing elements 706 (where, for example, resistor 708, node 712, and resistor 710 represent one strain sensing element).

In some embodiments, a switch (not shown) can be connected in series with the fusible link between the fusible link and the array 704 (or between the fusible link and a respective output of the transmitter channel ($V_{REF\_TOP}$ output or $V_{REF\_BOT}$ output)). The switch may be opened to disconnect the fusible link from the array 704. Similarly, the switch may be closed to connect the fusible link to the array 704. Any suitable switch may be used to disconnect or connect an external resistor from the array 704.

Figure 12:
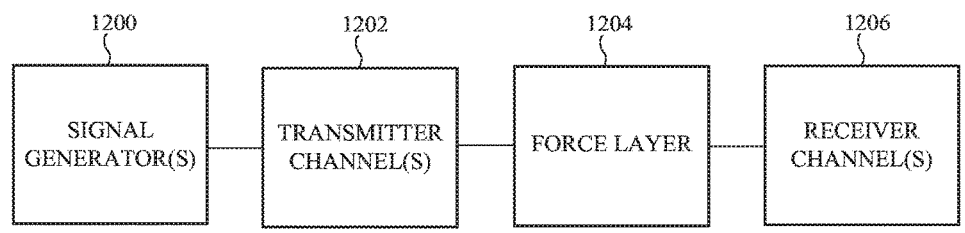
FIG. 12 shows a block diagram of another force sensor that is suitable for use as the force sensor shown in FIG. 5.

FIG. 12 shows a block diagram of another force sensor that is suitable for use as the force sensor shown in FIG. 5. One or more signal generators 1200 are connected to an input of one or more transmitter channels 1202. Each transmitter channel 1202 outputs a drive signal (e.g., voltages) that is received by the force layer 1204. In particular, the drive signals $V_{REF\_TOP}$ and $V_{REF\_BOT}$ are applied to the one or more strain sensing elements in the force layer 1204. The force signals produced by the strain sensing elements (e.g., 438 in FIG. 4) in the force layer 1204 are received by one or more receiver channels 1206. In this example embodiment, the signal generator(s) 1200 is configured to produce signals that result in a reduction of the common mode voltage received at the input of each differential amplifier in the one or more receiver channels 1206.

Figure 13:
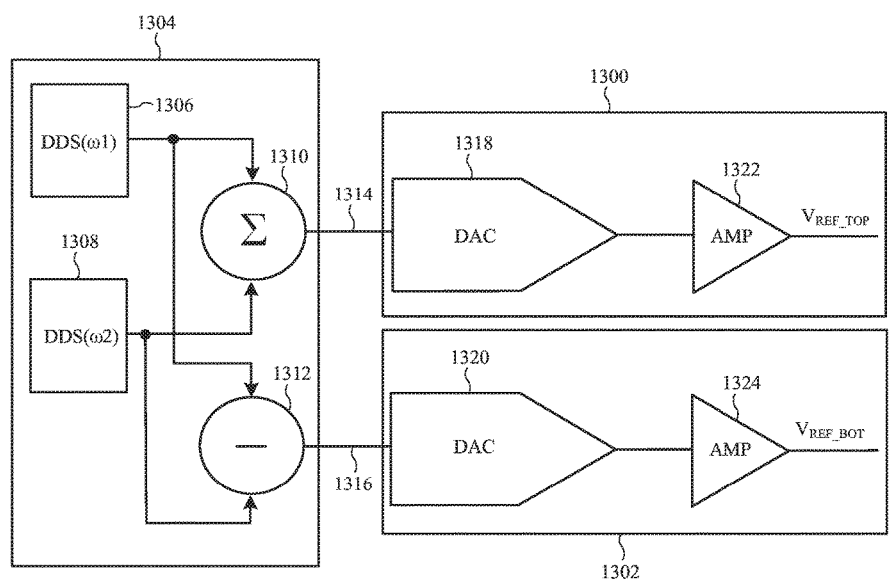
FIG. 13 shows an example signal generator and transmitter channels that are suitable for use with the force sensor shown in FIG. 12.

In one example embodiment, FIG. 13 shows a signal generator and two transmitter channels that are suitable for use with the force sensor shown in FIG. 12. In the illustrated embodiment, a first transmitter channel 1300 can be used to output the $V_{REF\_TOP}$ drive signal and a second transmitter channel 1302 may be used to output the $V_{REF\_BOT}$ drive signal. The signal generator 1304 includes two direct digital synthesis (DDS) circuits 1306, 1308 that are each connected to a summing circuit 1310 and a difference circuit 1312. The output of the first DDS circuit 1306 is electrically connected to an input of the summing circuit 1310 and an input of the difference circuit 1312. The output of the second DDS circuit 1308 is electrically connected to another input of the summing circuit 1310 and another input of the difference circuit 1312.

The DDS circuits 1306, 1308 operate independent of each other. The DDS circuits 1306, 1308 are configured to synthesize digital signals that when combined by the summing and difference circuits 1310, 1312 produce independent drive signals on signal lines 1314, 1316, respectively. The DDS circuits 1306, 1308 are running at the same frequency but the signals on signal lines 1314, 1316 can be weighted differently.

The drive signal on signal line 1314 is received by the first transmitter channel 1300, and the drive signal on signal line 1316 is received by the second transmitter channel 1302. Each transmitter channel 1300, 1302 includes a digital-to-analog converter 1318, 1320 connected in series with an amplifier 1322, 1324. The digitally-controlled independent drive signals produced by the DDS circuits 1306, 1308 can be subtracted from the common mode at all channels to reduce the common mode range.

Figure 14:
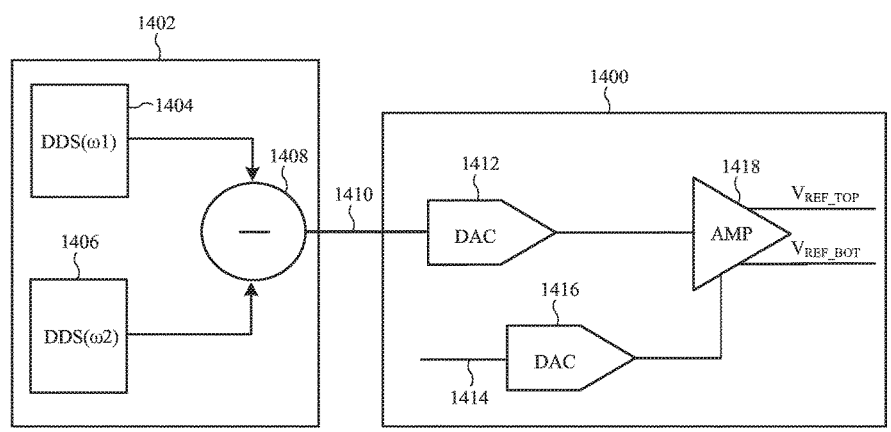
FIG. 14 shows another example signal generator and transmitter channel that are suitable for use with the force sensor shown in FIG. 12.

FIG. 14 shows another example signal generator and transmitter channel that is suitable for use with the force sensor shown in FIG. 12. In the illustrated embodiment, a transmitter channel 1400 can be used to output the $V_{REF\_TOP}$ drive signal and the $V_{REF\_BOT}$ drive signal. The signal generator 1402 includes two DDS circuits 1404, 1406 that are each connected to an input of a difference circuit 1408. The difference circuit 1408 is configured to subtract the output from one DDS circuit (e.g., 1404) from the output of the other DDS circuit (e.g., 1406). A differential signal is output from the difference circuit 1408 on signal line 1410.

The transmitter channel 1400 includes two digital-to-analog converters 1412, 1416 each having an output that is connected to a respective input of a differential amplifier 1418. The differential signal on signal line 1410 is input into the digital-to-analog converter 1412, which converts the digital differential signal to an analog differential signal. A common mode signal on signal line 1414 is received by the digital-to-analog converter 1416. The digital-to-analog converter 1416 converts the digital common mode signal to an analog common mode signal. The differential amplifier receives the analog common mode signal and the analog differential signal and outputs the $V_{REF\_TOP}$ and $V_{REF\_BOT}$ signals.

Figure 15:
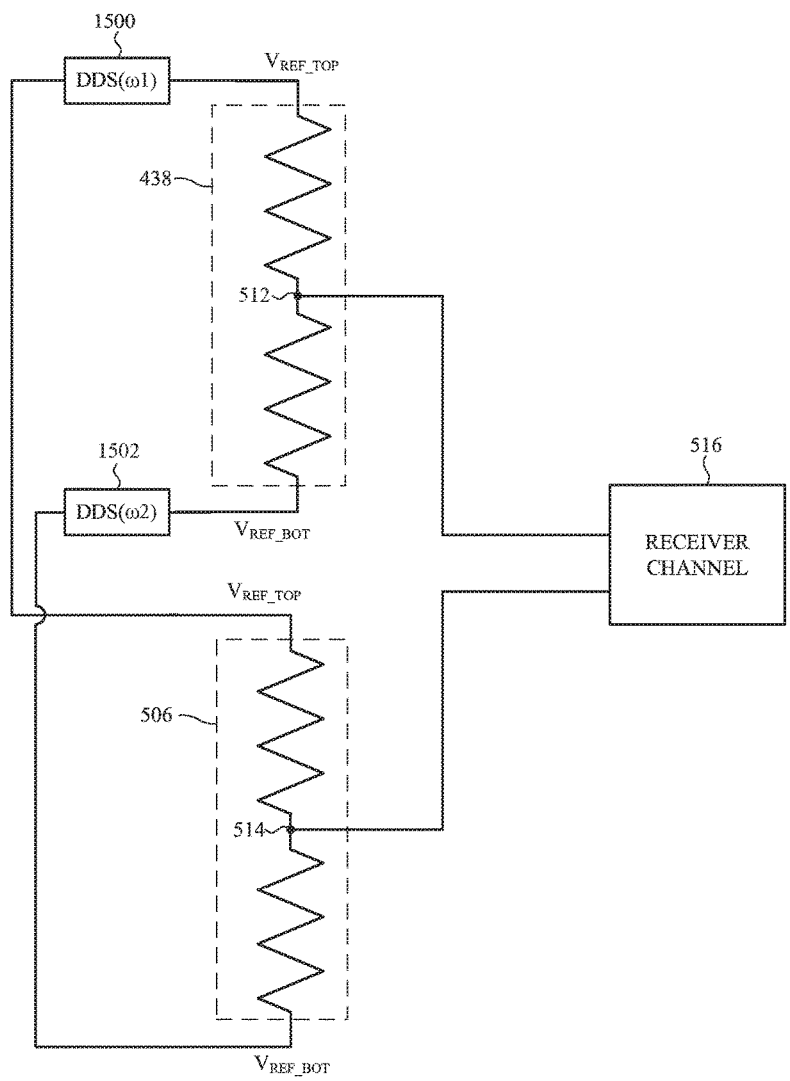
FIG. 15 shows another example signal generator and transmitter channel that are suitable for use with the force sensor shown in FIG. 12.

FIG. 15 shows another example signal generator and transmitter channel that is suitable for use with the force sensor shown in FIG. 12. In this illustrated embodiment, the signal generator and the transmitter channel are implemented with DDS circuits 1500, 1502. The DDS circuit 1500 can generate the $V_{REF\_TOP}$ signal received by a first input (e.g., 508 in FIG. 5) of each strain sensing element (e.g., strain sensing element 438) and a first input of the reference element (e.g., reference element 506). A separate DDS circuit 1502 can generate the $V_{REF\_BOT}$ signal received by a second input (e.g., input node 510 in FIG. 5) of each strain sensing element (e.g., strain sensing element 438) and a second input of the reference element (e.g., reference element 506). The receiver channel 516 receives the force signal from node 512 and the reference signal from node 514. The receiver channel 516 may be configured as shown in FIG. 6.

Figure 16:
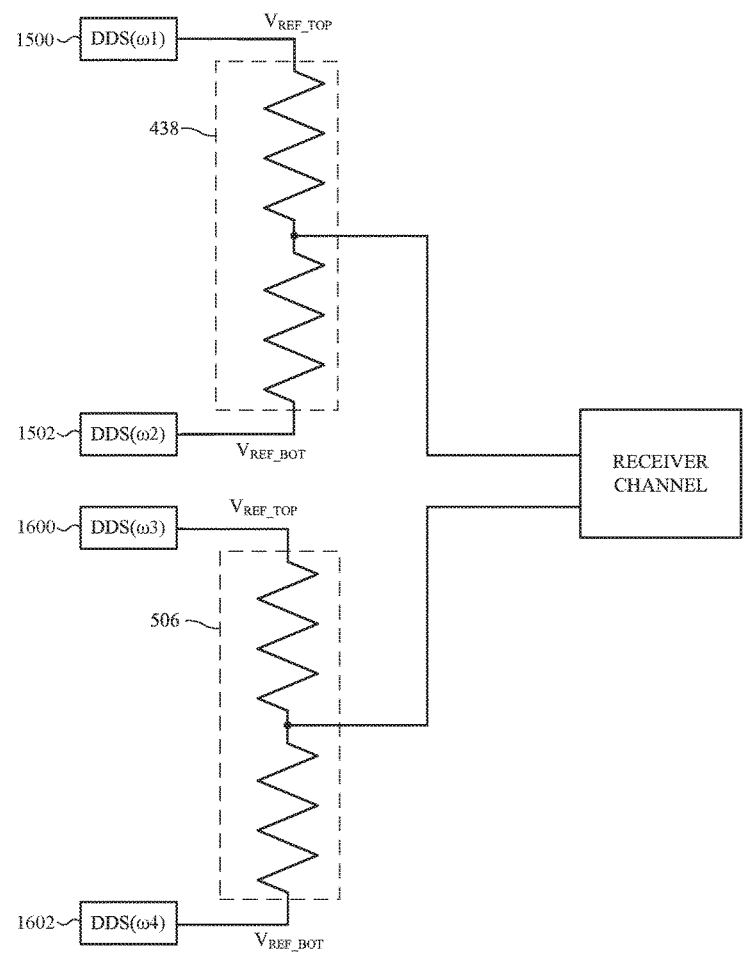
FIG. 16 shows an alternative signal generator and transmitter channel to the embodiment shown in FIG. 15.

FIG. 16 shows an alternative signal generator and transmitter channel to the embodiment shown in FIG. 15. The DDS circuit 1500 can generate the $V_{REF\_TOP}$ signal received by a first input (e.g., input node 508 in FIG. 5) of each strain sensing element (e.g., strain sensing element 438) and a separate DDS circuit 1600 may generate the $V_{REF\_TOP}$ signal received by the first input (e.g., input node 508) of the reference element (e.g., reference element 506). Similarly, the DDS circuit 1502 can generate the $V_{REF\_BOT}$ signal received by a second input (e.g., input node 510 in FIG. 5) of each strain sensing element and a separate DDS circuit 1602 may generate the $V_{REF\_BOT}$ signal received by the second input (e.g., input node 510 in FIG. 5) of the reference element.

Although shown in separate figures, the various embodiments can be used together to reduce common mode voltage received at the input of each differential amplifier and/or to reduce the common mode range. For example, in one embodiment one or more external resistors can be connected to an output of the transmitter channel(s) in addition to including the DDS circuits in a signal generator. Additionally, in another embodiment a fusible link can be connected in parallel with one or more external resistors in addition including the DDS circuits in a signal generator.

Additionally, the disclosed embodiments describe the one or more external resistors as being connected in parallel. However, other embodiments are not limited to this configuration of external resistors. The external resistors can be arranged in any suitable configuration. For example, various combinations of in series and in parallel resistors may be connected between the transmitter channel(s) and the array.

Similarly, the disclosed embodiments describe the fusible links as being connected in parallel with the one or more external resistors. However, other embodiments are not limited to this configuration. One or more fusible links can be arranged in any suitable configuration. For example, various combinations of in series and in parallel fusible links may be connected between the transmitter channel(s) and the array.

Additionally, as disclosed in U.S. patent application Ser. No. 14/749,571, filed on Jun. 24, 2015, and entitled "Systems and Methods for Measuring Resistive Sensors," an electronic device can also include an integrated circuit that itself includes two digitally variable resistors, an addressing controller to couple the first resistive sensor, second resistive sensor, the first digitally variable resistor, and the second digitally variable resistor into a balancing network such as a Wheatstone bridge, and a calibration controller to balance the balancing network. Some embodiments can include a configuration in which the first digitally variable resistor may be positioned physically proximate the second digitally variable resistor within the integrated circuit such that the temperature of the first digitally variable resistor may be substantial equal to the temperature of the second digitally variable resistor.

Embodiments may also relate to, include, or take the form of a method of calibrating a force sensor with a first and second resistive strain sensors arranged on opposite sides of a substrate and electrically coupled as a first voltage divider, the method including at least the operations of coupling a first digitally-controlled resistor to a second digitally controlled resistor as a second voltage divider, coupling the first voltage divider to the second voltage divider to form a balancing network (e.g., Wheatstone bridge), adjusting the resistance of the first digitally-controlled resistor and the resistance of the second digitally-controlled strain sensors until the balancing network may be balanced, and storing the resistance of the first digitally-controlled resistor and the second digitally-controlled strain sensor.

Further embodiments may relate to, include, or take the form of a method of reading a force sensor with a first and second resistive strain sensors arranged on opposite sides of a substrate and electrically coupled as a first voltage divider, the method including at least the operations of coupling a first digitally-controlled resistor to a second digitally controlled resistor as a second voltage divider, coupling the first voltage divider to the second voltage divider to form a balancing network, setting the resistance of the first and second digitally controlled resistor based on a first and second calibration value, and obtaining a measurement of a voltage between nodes of the balancing network.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   a force layer comprising:
      a substrate;
      a first strain sensitive structure formed in or on a first surface of the substrate; and
      a second strain sensitive structure formed in or on a second surface of the substrate and aligned in at least one direction with the first strain sensitive structure to form a strain sensing element;
   a transmitter channel operably connected to the force layer and configured to provide drive signals to the strain sensing element; and
   at least one external resistor operably connected in series between a first output of the transmitter channel and the first strain sensitive structure.

2. The electronic device of claim 1, wherein the at least one external resistor comprises two or more external resistors connected in parallel.

3. The electronic device of claim 1, further comprising a first fusable link connected in parallel with the at least one external resistor.

4. The electronic device of claim 1, wherein the at least one external resistor comprises at least one first external resistor, and wherein at least one second external resistor is operably connected in series between a second output of the transmitter channel and the second strain sensitive structure.

5. The electronic device of claim 4, wherein the at least one second external resistor comprises two or more resistors connected in parallel.

6. The electronic device of claim 4, further comprising:
   a first fusable link connected in parallel with the at least one external resistor; and
   a second fusable link connected in parallel with the at least one second external resistor.

7. The electronic device of claim 1, further comprising a receiver channel operably connected to the strain sensing element, wherein the receiver channel comprises a differential amplifier operably connected to a digital-to-analog converter.

8. The electronic device of claim 7, wherein the at least one external resistor effectively increases a resistance of the first strain sensitive structure to reduce a common mode voltage received by the differential amplifier.

9. The electronic device of claim 1, wherein:
the first strain sensitive structure is one of multiple strain sensitive structures in a first set of independent strain sensitive structures formed in or on the first surface of the substrate; and
the second strain sensitive structure is one of multiple strain sensitive structures in a second set of independent strain sensitive structures formed in or on the second surface of the substrate.

10. The electronic device of claim 1, wherein the force layer is included in a display stack of a display.

11. The electronic device of claim 1, wherein the first and the second strain sensitive structures are formed with an opaque material.

12. The electronic device of claim 1, wherein the transmitter channel is a first transmitter channel, and the electronic device further comprises:
a signal generator configured to produce two or more signals, wherein a first signal is produced at a first output and a second signal is produced at a second output, and wherein the first transmitter channel is operably connected to the first output of the signal generator to receive the first signal;
a second transmitter channel operably connected to the second output of the signal generator to receive the second signal, wherein the second transmitter channel is configured to provide drive signals to the strain sensing element; and
a receiver channel operably connected to the strain sensing element, wherein
the receiver channel comprises a differential amplifier; and
at least one drive signal produced by a respective transmitter channel is designed to reduce a level of common mode voltage that is received by the differential amplifier in the receiver channel.

13. The electronic device of claim 12, wherein the signal generator comprises:
a first direct digital synthesis (DDS) circuit having a first output operably connected to a summing circuit and a second output operably connected to a difference circuit; and
a second DDS circuit having a third output operably connected to the summing circuit and a fourth output operably connected to the difference circuit, wherein the first signal is produced by the summing circuit and the second signal is produced by the difference circuit.

14. The electronic device of claim 12, wherein:
the first strain sensitive structure is one of multiple strain sensitive structures in a first set of independent strain sensitive structures formed in or on the first surface of the substrate; and
the second strain sensitive structure is one of multiple strain sensitive structures in a second set of independent strain sensitive structures formed in or on the second surface of the substrate.

15. The electronic device of claim 14, wherein the first transmitter channel produces a first drive signal that is received at a first input node of the strain sensitive structures in the first set of independent strain sensitive structures and the second transmitter channel produces a second drive signal that is received at a second input node of the strain sensitive structures in the second set of independent strain sensitive structures.

16. The electronic device of claim 12, wherein the first and the second strain sensitive structures are formed with an optically transparent material.

17. The electronic device of claim 1, further comprising:
a signal generator configured to produce a difference signal, wherein the transmitter channel is operably connected to an output of the signal generator to receive the difference signal and configured to provide the drive signals to the strain sensing element based on the difference signal; and
a receiver channel operably connected to the strain sensing element, wherein
the receiver channel comprises a differential amplifier; and
at least one drive signal produced by the transmitter channel is designed to reduce a level of common mode voltage that is received by the differential amplifier in the receiver channel.

18. The electronic device of claim 17, wherein the transmitter channel comprises:
a first digital-to-analog circuit having an input operably connected to an output of the signal generator and an output operably connected to a first input of an amplifier; and
a second digital-to-analog circuit having an output operably connected to a second input of the amplifier.

19. The electronic device of claim 17, wherein the signal generator comprises:
a first direct digital synthesis (DDS) circuit having an output operably connected to a difference circuit; and
a second DDS circuit having an output operably connected to the difference circuit, wherein the difference signal is output from the difference circuit.

20. The electronic device of claim 1, further comprising:
a first signal generator configured to produce a first drive signal;
a second signal generator configured to produce a second drive signal, wherein the first strain sensitive structure is configured to receive the first drive signal, and the second strain sensitive structure is configured to receive the second drive signal; and
a receiver channel operably connected to the strain sensing element, wherein
the receiver channel comprises a differential amplifier; and
at least one drive signal produced by a transmitter channel is designed to reduce a level of common mode voltage that is received by the differential amplifier in the receiver channel.

* * * * *